United States Patent [19]

Matsubara et al.

[11] 3,936,342
[45] Feb. 3, 1976

[54] STEEL PLATE BONDING PROCESS AND PRIMER COMPOSITION

[75] Inventors: Takashi Matsubara; Yuko Takeuchi; Toshiro Hirose, all of Nagoya, Japan

[73] Assignee: Toagosei Chemical Industry Co., Ltd., Tokyo, Japan

[22] Filed: Feb. 14, 1974

[21] Appl. No.: 442,557

[30] Foreign Application Priority Data
Feb. 15, 1973  Japan................................ 48-18543

[52] U.S. Cl. ................ 156/330; 156/335; 260/831; 428/416; 428/457; 428/460; 428/474
[51] Int. Cl.² ................B32B 15/08; B32B 27/34; B32B 27/38
[58] Field of Search ............ 156/330, 335; 161/186, 161/215, 227; 260/831, 837; 428/416, 460, 474, 457

[56] References Cited
UNITED STATES PATENTS
3,409,581   11/1968   Hagan, Jr............................ 260/831
3,663,354   5/1972    Veno et al. ........................ 161/227
3,773,589   11/1973   Kaiser et al........................ 161/227

Primary Examiner—Douglas J. Drummond
Assistant Examiner—Michael W. Ball
Attorney, Agent, or Firm—Sughrue, Rothwell, Mion, Zinn & Macpeak

[57]  ABSTRACT

A process for bonding steel sheets, e.g., into metallic cans, which comprises applying first a primer comprising 0.1 to 2.5 weight parts of a bisphenol type A epoxy resin having a mean molecular weight of more than about 800, preferably 2000 to 4000, and 1 weight part of thermosetting phenolic resin, which is obtained by heating an aqueous solution comprising phenol, ortho-cresol and formaldehyde in the presence of a catalyst and reacting them with each other under refluxing conditions, on the surface of the steel sheets, heating the resultant steel sheets, and then bonding the steel sheets with a polyamide, and a primer composition for use in the process.

8 Claims, No Drawings

STEEL PLATE BONDING PROCESS AND PRIMER COMPOSITION

BACKGROUND OF THE INVENTION

1. Field of the Invention

This invention relates to a process for bonding steel sheets, such as chromated steel sheets, tin plates, or untreated rolled steel sheets, with a polyamide adhesive which comprises applying first a primer of 0.1 to 2.5 weight parts of a bisphenol A type epoxy resin having a mean molecular weight of more than about 800 and 1 weight part of a thermosetting phenolic resin, which is obtained by reacting a mixture of orthocresol, about 10 to 60 weight parts, and phenol, about 40 to 90 weight parts, with formaldehyde in the presence of an alkali catalyst, on the surfaces of the steel sheets, and then heating the treated steel sheets.

2. Description of the Prior Art

Although many attempts have been made to bond steel sheets with adhesives, fully satisfactory results have not yet been obtained with respect to bonding speed, bonding strength (variations in the bonding strength occur), water proofing properties and heat resistance.

The speed for producing metallic cans by soldering is about 400 cans/min, while that using bonding must be 600 to 800 cans/min. Such high speed bonding work requires a heating and compressing time of at most 10 seconds, preferably 2 to 3 seconds.

Polyamide forms an advantageous adhesive together with an epoxy resin, a phenol resin or a like thermosetting resin, but this adhesive mixture requires a long time for three-dimensional hardening.

For example, the time required for fully hardening the adhesive mixture is several minutes to several tens of minutes at a temperature of 150° to 250°C. Accordingly, the polyamide-thermosetting resin mixture adhesive is not suitable for quick bonding work.

A very high bonding strength must be retained for food cans over a wide temperature range, for example, such cans are subjected to a vapor sterilizing treatment and cold storage at a temperature of −20° to 30°C.

Further, U.S. Pat. No. 3,663,354 discloses a primer which is adhesive to both metals and linear polyamides which is a precondensate of (1) a resole type phenolic resin prepared from a mixture of phenols comprising p-cresol and at least one tri- or higher functional phenol and (2) an epoxy resin. However, the present inventors have unexpectedly found that the present invention can provide a superior bonding strength under a high temperature than that of the above cited U.S. Patent.

SUMMARY OF THE INVENTION

Therefore, an object of this invention is to provide a process for bonding steel sheets, e.g., into cans, with an extremely quick bonding rate of less than 10 sec/can, preferably 2 to 3 sec/can, and a primer composition for use in the process.

Another object of this invention is to provide a process for bonding steel sheets into metallic cans in which the zone bonded retains fully a high bonding strength over a broad temperature range of −30° to 130°C and is durable under conditions employed in vapor sterilizing, and a primer composition use in the process.

The process of this invention comprises applying first a primer of 0.1 to 2.5 weight parts, preferably 0.5 to 1.0 weight parts, of a bisphenol type A epoxy resin having a mean molecular weight of more than about 800, preferably 2000 to 4000, and 1 weight part of a thermosetting phenolic resin, which is obtained by heating an aqueous solution of (a) phenol and orthocresol as a phenolic component and (b) formaldehyde as an aldehyde component, with the proportion by weight of the orthocresol to the phenol ranging from about 60 : 40 to 10 : 90, in the presence of a catalyst and reacting them with each other under refluxing conditions, on the surface of the steel sheets, and then bonding the steel sheets with a polyamide.

DETAILED DESCRIPTION OF THE INVENTION

A feature of this invention is such that steel sheets can be bonded to each other and the zone bonded retains high strength over a wide temperature range, especially in an atmosphere saturated with water and under sterilizing temperature conditions (about 120°C).

Another feature of this invention lies in the special heat treating conditions for the phenol-epoxy resin composition, wherein the time required for heat treating the composition is less than 10 min., usually 1 to 5 min., at a heat treating temperature of 210° to 280°C. (In contrast to this, phenol-epoxy resin compositions are conventionally heat-treated for 10 to 30 min. at 200° to 210°C.)

The weight ratio of orthocresol to the phenol in the thermosetting phenolic resin used in the process of this invention must be about 60 : 40 to 10 : 90, preferably 50 : 50 to 15 : 85. With such a weight ratio, the advantageous effects of this invention are fully exhibited. The thermosetting phenolic resin can be modified using small amounts of other cresols, xylenols, other alkylphenols such as p-tert.-butylphenol and ethylphenol, or mono- or polyhydric phenols such as resorcin, naphthol, bisphenol A and the like. The amount of the phenols which can be employed is less than 20% by weight to the total phenolic component employed, i.e., the total of the phenol and the orthocresol.

Such thermosetting phenols can be produced by reacting the phenol, the orthocresol and the formaldehyde aqueous solution with each other in the presence of an alkali catalyst under heating at a temperature ranging from about 60°C to refluxing, with refluxing conditions being preferred and removing the water from the resultant resin. Sodium hydroxide, potassium hydroxide, calcium hydroxide, ammonia, hexamethylene tetramine, trimethyl amine, triethylamine and pyridine can be suitably used as the alkali catalyst. Ammonia and hexamethylene tetramine are preferred catalysts used in the process of this invention. A suitable amount of the catalyst employed is about 0.2 to 5% by weight, preferably 0.5 to 3% by weight, based on the amount of the reactants employed.

The removal of water from the resultant resin is carried out, for example, by extracting the resin contained with butanol, ethanol, ethyl acetate, methyl ethyl ketone, benzene, toluene or a mixture thereof, washing the extracted solution with water to remove the unreacted formaldehyde and the catalyst, and heating the resultant solution under normal or reduced pressures to expel the solvent and water.

The resin thus obtained is a resole type mixed phenolic resin having a mean molecular weight of 250 to 350, which is mainly composed of phenol nuclei and orthocresol nuclei, both being combined through a methylene bond or a methylether bond and having a terminal methylol group.

The bisphenol A type epoxy resin as used in this invention is a condensation polymer obtained by reacting epichlorohydrin with 2,2-bis (4'-hydroxyphenol) propane and having the following structural formula;

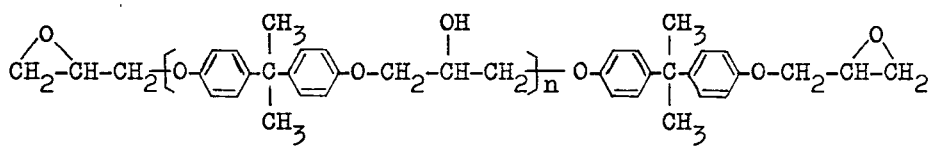

where $n$ is such that the molecular weight of the bisphenol A type epoxy resin is within the above-described molecular weight range.

The mean molecular weight is the numeral mean molecular weight calculated from the epoxy equivalent.

Suitable examples of bisphenol A type epoxy resins having a mean molecular weight of more than about 800 are Epikote 828 (epoxy equivalent 182–194, hydroxyl group content 0.06, mean molecular weight 355), Epikote 1001 (epoxy equivalent 450–500, hydroxyl group content 0.29, mean molecular weight 900), Epikote 1004 (epoxy equivalent 900–1000, hydroxyl group content 0.33, mean molecular weight 1400), Epikote 1007 (epoxy equivalent 1750–2150, hydroxyl group content 0.36, mean molecular weight 2900), Epikote 1009 (epoxy equivalent 2400–3500, hydroxyl group content 0.40, mean molecular weight 3750), Epikote 1031 (epoxy equivalent 200–240, hydroxyl group content 0, mean molecular weight 703), trade names, produced by Shell Oil Co., Ltd., and Araldite 6097 (epoxy equivalent 1750–2150), trade names, produced by Ciba, Ltd.

The epoxy equivalent is the number of grams of the resin containing 1 g equivalent of epoxy groups. The hydroxyl group content is the number of OH groups in 100 g of the resin.

Sufficient strength is not obtained where a bisphenol type A epoxy resin, alicyclic epoxy resin or tetraepoxy resin, each having a mean molecular weight of less than about 800, is used. On the other hand, a bisphenol A type epoxy resin having a mean molecular weight of more than 5000 is not advantageous to use due to its poor solubility.

When more than 2.5 weight parts of bisphenol A type epoxy resin is used with 1 weight part of the thermosetting phenolic resin, severe curing conditions are required and an unpractically long curing time is required. On the other hand, if less than 0.1 weight parts of the bisphenol A type epoxy resin is used, full bonding strength is not achieved.

The curing of the thermosetting phenolic resin and bisphenol phenol A type epoxy resin composition is carried out at about 180° to 300°C for about 30 sec. to 15 min., preferably at 210° to 280°C for 1 to 5 min.

Where the thermosetting phenolic resin and bisphenol A type epoxy resin composition is applied to steel sheets, the composition is dissolved in a solvent, such as acetone, methyl ethyl ketone, methyl isobutyl ketone, cyclohexanone, isophorone or like ketones, benzene, toluene, xylene or like aromatic compounds, ethylene glycol monomethyl ether, ethylene glycol monoethyl ether, ethylene glycol monobutyl ether or like cellosolves, ethylene glycol monomethyl ether acetate, ethylene glycol monoethyl ether acetate, ethylene glycol monobutyl ether acetate, ethyl acetate or like esters, diacetone alcohol, n-butanol or like alcohols, or a mixture thereof, and the solvent is removed from the coated resin layer by drying thereby to cure the resin layer, suitably having a thickness of 1 to 10 $\mu$, especially 2 to 6 $\mu$. A suitable solution concentration which is generally used ranges from about 25 to 40% by weight although this will vary depending on the blending ratios, the kind of solvent employed, the coating technique, etc.

Preferred polyamides used in this invention contain relatively long methylene chains, have a low water absorption rate and have favorable dimensional stability, such as nylon 11 which is a condensate of 11-aminoundecanoic acid, nylon 12 which is a ring opened polymer of $\omega$-lauryl lactam, nylon 610 which is obtained by the condensation of hexamethylene diamine and sebacic acid, and nylon 612. If desired, various polyamide copolymers can be used. To increase the durability, these polyamides have preferably more than 6 methylene groups per acid amide bond in the main chain.

The polyamides above described contain therein repeating units of the formula

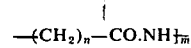

in which $n > 6$, for example, for the nylon 11, 12 and 13 series with $n$ being 10 for nylon 11, $n$ being 11 for nylon 12 and $n$ being 12 for nylon 13; of the formula

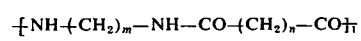

in which $(m+n)/2 > 6$, for example, for the nylon 610, 612 and 613 series with $m$ being 6 and $n$ being 8 for nylon 610, $m$ being 6 and $n$ being 10 for nylon 612 and $m$ being 6 and $n$ being 11 for nylon 613; and for copolymerized nylons repeating units of the formula

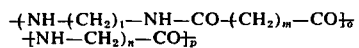

in which $$\frac{o}{o+p} \times \left(\frac{1+m}{2}\right) + \frac{p}{o+p} \times n > 6$$

for example, nylon 612/12, $o/(o+p)$ being 0.1, $p/(o+p)$ being 0.9, $l$ being 6, $m$ being 10 and $n$ being 11, and the formula

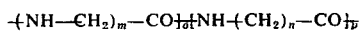

in which $$\frac{o}{o+p} \times m + \frac{p}{o+p} \times n > 6$$

for example, nylon 12/6, $o/(o+p)$ being 0.9, $p/(o+p)$ being 0.1, $m$ being 11 and $n$ being 5.

Prior to the application of the composition, the steel sheets can be degreased using, for example, trichloroethylene.

The polyamide, usually in the form of film or powder, is fully melted and applied to the steel sheets; for example, the nylon 12 is applied at 200° to 300°C, preferably 220° to 270°C, in 1 to 10 sec. A suitable temperature for applying the polyamide can range from about 20°C above the melting point of the polyamide to about 150°C above the melting point of the polyamide. A suitable thickness for the polyamide ranges from about 10 to 200 $\mu$, preferably 50 to 120 $\mu$.

The assembly of the steel sheets having thereon the cured primer composition and the polyamide adhesive can be suitably bonded in a short time using a pressure ranging from about 1 to 50 Kg/cm², preferably 2 to 15 Kg/cm².

The process according to this invention is applicable to various types of steel sheets as described below, but especially preferred results are obtained with chromated steel sheets.

Chromated steel sheets are produced using an electrolyzing process, in which the steel sheet is electrolyzed in a bath of a solution containing $CrO_3$ of a relatively low concentration of less than 100 g/l of $CrO_3$ and a small amount of phenol disulfonic acid, catechol-disulfonic acid or a salt thereof, $H_2SO_4$, or a fluorine compound such as sodium silicofluoride ($Na_2SiF$), or using another electrolyzing process in which the steel sheet is electrolyzed in a high concentration $CrO_3$ solution containing more than 100 g/l of $CrO_3$ to form a Cr plated layer. The plate is then washed with water, and electrolyzed in a low concentration $CrO_3$ solution. "Hi-top" and "Supercoat" (trade names produced by Toyo Kohan K.K.) are commercially available examples of chromated steel sheets produced according to the first electrolyzing process, and "Cansuper" (trade name, produced by Nippon Steel Corp.), and "Weirchrome" (trade name, produced by National Steel) are commercially available examples of chromated steel sheets produced according to the second electrolyzing process. All of these chromated steel sheets have an extremely thin metallic chromium layer and a hydrated chromate layer. The thickness of the metallic chromium layer is usually 0.05 to 2 mg/dm². Recently, a steel sheet having a thinner layer has been developed. Another chromated steel sheet commercially available as "Hinak" (trade name produced by Nippon Kokan K.K.) is produced by dipping a steel sheet in an aqueous solution containing $CrO_3$ and a reducing agent, removing the steel sheet, and heating and drying the dipped sheet to form a single layer of hydrated chromate.

A zinc plated steel sheet is produced usually by dipping a steel sheet cleaned using sulfuric acid or hydrochloric acid in a molten zinc bath, and a tin plated steel sheet is produced by dipping a steel sheet in a molten tin bath or by electroplating the steel sheet in a bath of stannous chloride 76 g/l, sodium fluoride 25 g/l, potassium fluoride 50 g/l and sodium chloride 45 g/l.

The following examples are given to illustrate the invention in greater detail. Unless otherwise indicated, all parts, percents, ratios and the like are by weight.

EXAMPLE 1

Phenol (70 g) and orthocresol (30 g) were dissolved in 37% formalin (106 g), and a 25% ammonia aqueous solution (10 g) was added to the solution. The resultant mixture was reacted under refluxing conditions in a vessel provided with a reflux condenser for 1 hour, and the resin layer was dissolved in n-butanol (100 g). Benzene (100 g) and ethanol (100 g) were added to the solution, which was then washed 3 times with water (200 g). Subsequently, the organic layer obtained was condensed under reduced pressure to obtain an orthocresol modified phenolformaldehyde resin (thermosetting phenolic resin) which was yellow-brown in color and a viscous material.

The resin thus obtained and "Epikote 1007" (mean molecular weight 2900), as a bisphenol A type epoxy resin, were mixed together in the proportion shown in Table 1, and dissolved in methyl ethyl ketone to prepare a resin solution of a concentration of 20%.

This resin solution was applied to a chromated steel sheet ("Cansuper", thickness: 0.24 mm), an untreated rolled steel sheet (thickness: 0.27 mm) and a zinc plated steel sheet (thickness about 0.25 mm; amount of zinc applied to the steel sheet: 183 g/m²), and these steel sheets were dried at 60°C in an air stream. Then, the applied resin solution layers on the steel sheet surfaces were cured at 240°C for 3 min. The resin amount cured and adhered to the steel sheet surface was 50 mg/100 cm².

Then, a dried film of nylon 12 ("Platilon L", produced by Toagosei Chemical Industry Co., Ltd.) having a thickness of 100 $\mu$ was put between a pair of the steel sheets, and the resultant assembly was hot-pressed at 280°C for 3 sec. The laminated sheets obtained were exposed to room temperature (about 20 to 30°C) for 1 day, and subjected to testing to examine the T-peel strength using a tension tester controlled at a constant temperature of 120°C ± 1°C. The test results obtained are shown in Table 1.

Table 1

| Test No. | Bisphenol A Type Epoxy Resin / Thermosetting Phenol Resin (weight ratio) | T-peel Strength (Kg/25 mm) | | |
|---|---|---|---|---|
| | | A | B | C |
| *1 | 0.5 / 9.5 | 8.9 | 10.3 | 7.6 |
| 2 | 2 / 8 | 26.1 | 23.5 | 20.2 |
| 3 | 4 / 6 | 29.4 | 30.1 | 25.5 |
| 4 | 6 / 4 | 25.0 | 27.1 | 24.2 |
| *5 | 8 / 2 | 10.0 | 10.2 | 8.8 |

A - Chromated Steel Sheet
B - Untreated Rolled Steel Sheet
C - Zinc Plated Steel Sheet
*Comparative Examples

EXAMPLE 2

The same resins as described in Example 1 were applied to chromated steel sheets ("Cansuper," thickness: 0.24 mm) keeping the weight proportion of the bisphenol A type epoxy resin to the thermosetting phenol resin at a ratio of 4/6. A film (100 $\mu$ thickness) of nylon 11 ("Platilon E," produced by Toagosei Chemical Industry Co., Ltd.) was used to produce laminated steel sheets using the same conditions as described in Example 1.

The influence of the tension temperature on the T-peel strength was examined by varying the tension temperature. The test results obtained are shown in Table 2.

Table 2

| Test No. | Tension Temperature (°C) | T-peel Strength (Kg/25 mm) |
|---|---|---|
| 1 | −20 | 38.8 |
| 2 | 0 | 42.0 |
| 3 | 25 | 49.1 |
| 4 | 50 | 51.0 |
| 5 | 80 | 42.4 |
| 6 | 100 | 37.6 |
| 7 | 120 | 30.8 |
| 8 | 130 | 20.4 |

It will be apparent from the results contained in Table 2 that the peeling strength of the bonded zone of the chromated steel sheets is unexpectedly high over a broad temperature range, especially at higher temperatures of more than 100°C.

EXAMPLE 3

Various types of bisphenol A type epoxy resins were used in the test described in Example 1, keeping the weight ratio of the epoxy resin/thermosetting phenolic resin at 4/6 and using the chromated steel sheet as described in Example 1 ("Cansuper"). The other treating conditions were the same as those described in Example 1. The T-peel strength of the resultant laminated sheets at 120°C ± 1°C is shown in Table 3. In Table 3, the "Epikotes" are as previously described and "Chisso nox CX-221" is a trade name for an alicyclic epoxy resin produced by Chisso Ltd. "Epikote 1031" is the tetraglycidyl ether of tetrakis(hydroxyphenyl)ethane.

Table 3

| Test No. | Type of Epoxy Resin (mean molecular weight) | T-peel Strength (Kg/25 mm) |
|---|---|---|
| *1 | Epikote 828 (380) | 5.6 |
| 2 | Epikote 1004 (1400) | 24.6 |
| 3 | Epikote 1007 (2900) | 30.9 |
| *4 | Epikote 1031 (703) | 9.8 |
| *5 | Chisso nox CX-221**(252) | 4.1 |

*Comparative Examples
**Epoxy equivalent 134–140; hydroxy group content 0; and mean molecular weight 252

EXAMPLE 4

Chromated steel sheets ("Cansuper", thickness: 0.24 mm) were bonded into a laminated sheet in the same manner as described in Example 1 except for using the thermosetting phenolic resins produced using various weight ratio of phenol to orthocresol in the resin. Table 4 shows the test results of the T-peel strength at 120°C ± 1°C. The weight ratio of the epoxy resin to the thermosetting phenol resin was 4/6.

Table 4

| Test No. | Phenol (g) | Orthocresol (g) | T-peel Strength (Kg/25 mm) |
|---|---|---|---|
| *1 | 100 | 0 | 6.5 |
| 2 | 90 | 10 | 24.6 |
| 3 | 80 | 20 | 30.3 |
| 4 | 70 | 30 | 30.9 |
| 5 | 50 | 50 | 27.7 |
| *6 | 30 | 70 | 10.1 |
| *7 | 0 | 100 | 6.1 |

*Comparative Examples

While this invention has been described in detail and with reference to particular embodiments thereof, it will be understood that the various changes and modifications can be made therein without departing from the spirit and scope of the invention.

Therefore, the appended claims are intended to cover all such equivalent variations as coming within the true spirit and scope of the invention.

What is claimed is:

1. A process for bonding steel sheets which comprises applying a primer composition comprising 0.1 to 2.5 weight parts of a bisphenol type A epoxy resin having a mean molecular weight greater than about 800 per 1 weight part of a thermosetting phenolic resin obtained by reacting an aqueous solution of a mixture of orthocresol and phenol in a weight ratio of orthocresol to phenol ranging from about 60 : 40 to 10 : 90 with formaldehyde in the presence of an alkali catalyst, to the surface of the steel sheets, curing the applied primer composition on the steel sheet surfaces, and then bonding said steel sheets with a polyamide.

2. The process according to claim 1, wherein said steel sheets are chromated steel sheets.

3. The process according to claim 1, wherein said steel sheets are zinc plated steel sheets.

4. The process according to claim 1, wherein said steel sheets are untreated rolled steel sheets.

5. The process according to claim 1, wherein said bisphenol type A epoxy resin has a mean molecular weight of 2000 to 4000.

6. The process according to claim 1, wherein the weight ratio of orthocresol to phenol in said thermosetting phenolic resin ranges from 50 : 50 to 15 : 85.

7. The process according to claim 1, wherein said applying is conducted for less than 5 minutes at a temperature of higher than 210°C.

8. The process according to claim 7, wherein said polyamide is selected from the group consisting of nylon 11, nylon 12, nylon 13, nylon 610, nylon 612, nylon 613, nylon 612/12 and nylon 12/6.

* * * * *